United States Patent
Collier

(10) Patent No.: US 7,620,244 B1
(45) Date of Patent: Nov. 17, 2009

(54) METHODS AND SYSTEMS FOR SLANT COMPENSATION IN HANDWRITING AND SIGNATURE RECOGNITION

(75) Inventor: David C. Collier, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 665 days.

(21) Appl. No.: 10/752,332

(22) Filed: Jan. 6, 2004

(51) Int. Cl.
*G06K 9/18* (2006.01)
*G06K 9/00* (2006.01)

(52) U.S. Cl. ........................ 382/186; 382/119
(58) Field of Classification Search .................. 382/186
See application file for complete search history.

(56) References Cited

U.S. PATENT DOCUMENTS

| | | | |
|---|---|---|---|
| 4,155,072 A | 5/1979 | Kawa | |
| 4,701,960 A | 10/1987 | Scott | |
| 4,757,551 A | 7/1988 | Kobayashi et al. | |
| 4,845,768 A | 7/1989 | Kochert et al. | |
| 4,864,628 A | 9/1989 | Scott | |
| 5,325,447 A | 6/1994 | Vogt, III | |
| 5,408,540 A | 4/1995 | Zlotnick | |
| 5,410,141 A | 4/1995 | Koenk et al. | |
| 5,442,715 A | 8/1995 | Gaborski et al. | |
| 5,633,954 A | 5/1997 | Gupta et al. | |

(Continued)

OTHER PUBLICATIONS

Uchida et al., Nonuniform Slant Correction Using Dynamic Programming, 2001, Sixth International Conference on Document Analysis and Recognition, p. 434-438.*

(Continued)

*Primary Examiner*—Bhavesh M Mehta
*Assistant Examiner*—David P Rashid
(74) *Attorney, Agent, or Firm*—Charles D. Huston; Kevin L. Daffer; Daffer McDaniel, LLP

(57) ABSTRACT

Various computer-implemented methods are provided. One method for signature recognition includes identifying a vertical element of a signature and determining a tilt angle of the vertical element. Tilt angle is defined by a line that is approximately parallel to the vertical element. In addition, the method includes determining a tilt factor. Tilt factor is defined as a horizontal offset between the tilt angle and a reference tilt as a function of distance from a signature baseline. The method further includes altering the signature using the tilt factor and comparing the altered signature to known signature(s) to determine if the altered signature matches one of the known signature(s). Another method includes altering the signature using a predetermined tilt factor and comparing the altered signature to known signature(s). If the altered signature does not match one of the known signature(s), these steps may be repeated with different predetermined tilt factors.

19 Claims, 5 Drawing Sheets

U.S. PATENT DOCUMENTS

| | | | |
|---|---|---|---|
| 5,644,648 | A | 7/1997 | Bose et al. |
| 5,692,069 | A | 11/1997 | Hanson |
| 5,835,632 | A * | 11/1998 | Takasu et al. ............... 382/185 |
| 5,864,635 | A * | 1/1999 | Zetts et al. ................. 382/187 |
| 6,035,406 | A * | 3/2000 | Moussa et al. ................ 726/18 |
| 6,246,793 | B1 | 6/2001 | Rindtorff et al. |
| 6,424,728 | B1 | 7/2002 | Ammar |
| 6,445,820 | B1 * | 9/2002 | Love ......................... 382/187 |
| 6,499,043 | B1 | 12/2002 | Forcier |
| 2001/0000026 | A1 * | 3/2001 | Skoog ....................... 382/119 |
| 2002/0118879 | A1 | 8/2002 | Hickerson et al. |
| 2002/0196978 | A1 | 12/2002 | Hawkins et al. |

OTHER PUBLICATIONS

Slavik et al., Equivalence of Different Methods for Slant and Skew Corrections in Word Recognition Applications, Mar. 2001, vol. 23, No. 3, p. 323-326.*

Smithline, Limited Vocabulary Script Reader, IBM Technical Disclosure Bulletin, vol. 7, No. 6, Nov. 1, 1964, p. 473-475.*

Writer Identification Using Text Line Based Features, IEEE Computer Society, 2001, p. 101-05.*

* cited by examiner

METHODS AND SYSTEMS FOR SLANT COMPENSATION IN HANDWRITING AND SIGNATURE RECOGNITION

BACKGROUND OF THE INVENTION

1. Field of the Invention

The present invention generally relates to methods and systems for slant compensation in handwriting and signature recognition. Certain embodiments relate to recognition of a signature written on a digitizer with a stylus by a user.

2. Description of the Related Art

The following descriptions and examples are not admitted to be prior art by virtue of their inclusion within this section.

Many methods and algorithms have been developed for optical or digital character recognition. Of particular interest are methods and algorithms that can be used to recognize handwritten alphanumeric characters. Due to the complexity and variety of handwriting, many different methods and algorithms have been developed that attempt to compensate for differences in handwriting. Such methods and algorithms are generally very complex and yet generate somewhat inaccurate results. For example, some methods and algorithms for recognizing handwriting do not account for variable slant in different handwriting samples or within the same handwriting sample. As used herein, the term "slant" is generally defined as the angle between a vertical element of a handwriting sample and a vertical reference line. The terms "slant" may be commonly used interchangeably with the terms "lean" and "tilt." As a result, many methods and algorithms for recognizing handwriting may be substantially inaccurate or may even completely fail at recognizing handwriting samples having different slant.

There are, however, some methods and systems that are configured to account for slant in a handwriting sample. For example, as described in U.S. Pat. No. 5,410,141 to Koenck et al., which is incorporated by reference as if fully set forth herein, with signature verification, and also with reading of bar codes at random angles, an obtained digital image can be displayed on a display of a terminal along with a normalization line. The operator can rotate the normalization line with a manual control to indicate any pronounced slant of the signature or to indicate the angle of a single or multiple bar code stored image. The processing program can rotate the stored image, and display the normalized signature, or bar code image prior to validation processing or decoding. However, this method is disadvantageous due to the necessity of manual control which can be time consuming and may lead to inadvertent errors.

Other methods and systems are configured for "automatic" correction of slanting handwriting samples. For example, U.S. Pat. No. 4,701,960 to Scott, which is incorporated by reference as if fully set forth herein, describes methods for signature verification. In particular, Scott teaches verifying signatures by numerous techniques including aligning only a starting point of each signature waveform with each other or aligning an average height of the waveforms with each other over their entire lengths. However, Scott notes that in many instances there will be no correction for relative slant between signatures. In particular, Scott notes that the slant with which a person writes may be one of the key features which distinguishes his signature from others and prevents his signature from being forged. In this instance, relative slant would not be corrected for between the waveforms. According to Scott, failure to correct for relative slant results in a considerably higher score because the signatures will be aligned exactly on top of each other with the integral of the area between the curves much larger than if the relative slant were corrected. Therefore, in many signature applications, Scott teaches that it will be most desirable to not correct for relative slant between the signatures. Therefore, Scott appears to discourage correcting signatures for slant before signature verification.

Another character recognition method and system capable of recognizing slant characters is described in U.S. Pat. No. 4,757,551 to Kobayashi et al., which is incorporated by reference as if fully set forth herein. The system includes a scanner for optically scanning a document having thereon characters such as letters and numerals thereby converting visual character information into electrical character information, which is then converted to binary numbers. The binary converted image data is searched for individual character data and sent to a character feature extraction unit. The contour of each of the characters is determined and processed to determine a feature vector. The resultant feature vector is then supplied to a comparator for comparison with a plurality of reference feature vectors stored in more than one character library for determination or identification of the character data. The character libraries include a first library that includes a plurality of reference feature vectors for characters without inclination and a second library that includes a plurality of reference feature vectors for characters with inclination. Therefore, the character data can be identified irregardless of whether or not the features are inclined.

However, the methods and systems described by Kobayashi et al., have several disadvantages. For example, a character library must be created and stored for different inclinations. Therefore, the methods and systems described by Kobayashi et al. may be relatively time consuming, inflexible, and expensive. In addition, because there are a finite number of character libraries, there are a finite number of inclinations that can be accounted for by the character libraries. As such, the methods and systems described by Kobayashi et al. may be substantially limited in the number of different feature vectors that it can recognize thereby limiting the usefulness and accuracy of these methods and systems.

U.S. Pat. No. 4,864,628 to Scott, which is incorporated by reference as if fully set forth herein, describes a method and apparatus for reading printed text using light sensitive scanners. In one such method, a microprocessor may be taught parameters for each reference character. The microprocessor will determine a digital waveform for each character and place this waveform in memory as a reference character. To determine an unknown test character, the digital waveform of the test character is compared to the digital waveform of a reference character. Slant in the test character with respect to the reference character will show only as DC bias or an offset in the digital waveform. The microprocessor is therefore able to match waveforms of similar characters which are slanted with respect to each other by removing any DC bias. After the DC bias is removed, the digital waveforms of the test and reference characters will be exactly on top of each other. The microprocessor determines a score for each reference character with respect to the test character. The microprocessor determine the score by taking the integral of the area between the two curves. The integral with the lowest value will be said to be the correct match of the test character's digital waveform to the reference character's digital waveform.

The methods and systems described in U.S. Pat. No. 4,864,628 to Scott have many of the same disadvantages as the methods and systems described by Kobayashi et al. For example, a waveform must be created and stored for each different reference character. Therefore, the methods and systems described by Scott may be relatively time consuming, inflexible, and expensive. In addition, because there are a finite number of reference characters, there are a finite number of test characters that can be accounted for by these methods. As such, the methods and systems described by Scott may be substantially limited in the number of different test characters that it can recognize thereby limiting the usefulness and accuracy of these methods and systems.

U.S. Pat. No. 4,845,768 to Kochert et al., which is incorporated by reference as if fully set forth herein, describes a method and circuit arrangement for editing slanting characters, particularly handwritten characters. In particular, Kochert et al. describes an apparatus and method for storing signals produced by scanning a character at different angles, successively reading out the stored signals, observing the length of shadow on the base line during the readouts, comparing the length of the shadow to that of other readouts, and selecting the readout with minimum shadow length as the perpendicularly residing character (or non-slanted character) for further processing and recognition. Therefore, Kochert et al. identify the non-slanted character by scanning the character in multiple directions.

The methods of Kochert et al. may be extremely time consuming since determining the non-slanted character involves multiple scans of the character at different angles. In addition, since the non-slanted character is determined by finding the readout of the scans having the shortest possible shadow, it is conceivable that in some instances there may be multiple readouts having the shortest possible shadow (e.g., multiple solutions at opposite angles) that may cause the non-slanted character to be upside down. In this manner, identifying the correct non-slanted character may be largely dependent upon the selection of the first angle at which the character is scanned. Furthermore, it is conceivable that a "cursive" letter, depending on how it is written, may not actually have the shortest possible shadow in the correct scan direction, which may cause the "non-slanted characters" determined by these methods to be actually slanted. Therefore, although the methods of Kochert et al. appear to be relatively simple, they are also time consuming and may be somewhat inaccurate.

Methods and apparatuses for connected and degraded text recognition are also described in U.S. Pat. No. 5,644,648 to Bose et al., which is incorporated by reference as if fully set forth herein. In these methods, stroke identification is performed by first determining the direction of the dominant strokes in the image. Dominant strokes may be identified by scanning the pixel profiles with a preset range of angular directions at small intervals, and choosing the direction of the tallest peaks in the profile. If the direction of the dominant strokes is not vertical, the direction may be normalized by rotating the pixels on an imaginary slanted line (based on the slant angle) such that the pixels fall on a vertical line.

Although the methods described by Bose et al. may be suitable for individual alphanumeric characters and non-cursive text, these methods may be particularly unsuitable for signatures or other cursive handwriting. For example, rotating signatures or other cursive handwriting could be performed either by rotating the entire signature or by segmenting the signature and then rotating individual characters. However, rotating the entire signature would cause the signature to be slanted away from a baseline of the signature thereby reducing the accuracy of verification, recognition, or other processing of the signature. Similarly, segmenting signatures prior to rotation would be extremely difficult, if not impossible, for many signatures and could destroy distinctive features of the signatures that could be used in signature verification or recognition.

Accordingly, it may be desirable to develop a method for recognizing handwriting such as a signature that compensates for slant, tilt, or lean in the handwriting prior to further processing of the handwriting.

SUMMARY OF THE INVENTION

An embodiment of the invention relates to a computer-implemented method for recognizing a signature. The signature may be a signature written on a digitizer with a stylus by a user. The digitizer and the stylus can be arranged at different angles by the user. Therefore, the angle at which signatures are written may vary thereby introducing various degrees of tilt, slant, or lean in the signatures, which if not corrected will present significant problems for signature recognition. The signature may also be a signature written on a tablet computer by a user. In addition, the signature may include a signature written by a user at a log in prompt of a computer or a system. In some embodiments, the computer-implemented method may be performed as the signature is being written by a user (i.e., in "real time").

The method includes identifying a vertical element of the signature. The method also includes determining a tilt angle of the vertical element. The tilt angle is defined by a line that is approximately parallel to the vertical element. In addition, the method includes determining a tilt factor. The tilt factor is defined as a horizontal offset between the tilt angle and a reference tilt as a function of distance from a signature baseline.

The method further includes altering the signature using the tilt factor. For example, altering the signature using the tilt factor may include determining a distance between a portion of the signature and the signature baseline, identifying the horizontal offset corresponding to the distance using the tilt factor, and applying the corresponding horizontal offset to the portion of the signature. Altering the signature may include normalizing the signature such that the altered signature is substantially non-tilted. In addition, altering the signature preferably does not include rotating the signature, segmenting the signature, and/or normalizing thickness elements of the signature since such changes to the signature may remove or alter distinguishing characteristics of the signature, which may be advantageously used to recognize the signature.

The method also includes comparing the altered signature to one or more known signatures to determine if the altered signature matches one of the one or more known signatures. The one or more known signatures may have been corrected for tilt. Therefore, since altering the signature preferably produces an altered signature that is substantially non-tilted, when compared to one or more known signature that have been corrected for tilt, this method may match the signature of a user with a known signature with substantially more accuracy than other signature recognition methods or algorithms known in the art.

In some embodiments, prior to comparing the altered signature to the known signature(s), the method may include altering the signature by applying a baseline correction to the signature. The baseline correction is defined as a vertical offset between the signature baseline and a reference baseline as a function of distance from a starting line that corresponds to a leftmost point of the signature. In this manner, the signature may be corrected for tilt in two directions, which may further increase the accuracy of the signature recognition method. The above-described method may also include any other step(s) of any other method(s) described herein.

Another embodiment relates to a different computer-implemented method for recognizing a signature. This method includes altering the signature using a predetermined tilt factor. The predetermined tilt factor is defined as a horizontal offset as a function of distance from a signature baseline. The method also includes comparing the altered signature to one or more known signatures to determine if the altered signature matches one of the one or more known signatures. If the altered signature does not match one of the one or more known signatures, the method may include altering the signature using a different predetermined tilt factor. The method further includes comparing the different altered signature to the one or more known signatures to determine if the different altered signature matches one of the one or more known signatures.

In some embodiments, the method may include repeatedly altering the signature using a different predetermined tilt factor and comparing the different altered signature to the one or more known signatures until the different altered signature matches one of the one or more known signatures. In a different embodiment, the method may include repeatedly altering the signature using a different predetermined tilt factor and comparing the different altered signature to the one or more known signatures until the signature has been altered with a predetermined set of different predetermined tilt factors. This method may also include any other step(s) of any other method(s) described herein.

An additional embodiment relates to a computer-implemented method for normalizing handwriting. In one embodiment, the method may include acquiring the handwriting as input written on a digitizer with a stylus by a user. The digitizer and the stylus can be arranged at different angles by the user. In another embodiment, the method may include acquiring the handwriting as input from a user using a tablet computer. The method includes identifying a vertical element of the handwriting. The method also includes determining a tilt angle of the vertical element. The tilt angle is defined by a line that is approximately parallel to the vertical element. In addition, the method includes determining a tilt factor. The tilt factor is defined as a horizontal offset between the tilt angle and a reference tilt as a function of distance from a signature baseline.

The method further includes altering the handwriting using the tilt factor such that the altered handwriting is substantially non-tilted. In some embodiments, the method may include analyzing the altered handwriting by performing one or more functions on the altered handwriting. In another embodiment, the method may include repeating the steps of identifying a vertical element of the handwriting, determining the tilt angle of the vertical element, and determining the tilt factor at predetermined intervals to account for varying tilt within the handwriting.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
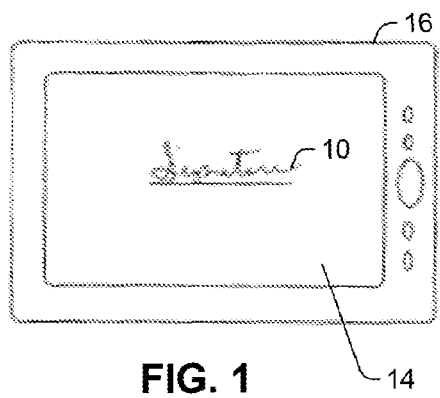
FIGS. 1 and 2 are schematic diagrams illustrating a signature written at different angles by a user.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Personal computers (PCs) and other computer systems (which are referred to herein simply as "systems") are increasingly designed for use with a stylus-type input device and a digitizer. The stylus-type input device often resembles a pen or other similar writing instrument. In fact, a stylus-type input device is sometimes commonly referred to as a "tablet pen" with reference to tablet PCs. The stylus-type input device may be used in a manner similar to a mouse. For instance, the stylus may be used to click on icons or text, click and drag icons or text, or perform other functions that are typically performed with a mouse. A digitizer is generally defined as a display screen that also functions as an input device. In some instances, a digitizer may function as a touch screen that can recognize input from being touched by a user's hand. Other digitizers may be used with a stylus or other input device to accept input from a user. Using a stylus and a digitizer, instead of a touch screen type digitizer, allows a digitizer to provide more icons or text within a smaller area since the stylus has a smaller contact area than a person's fingers. A stylus and a digitizer are often used in combination for hand-held personal computers or computer systems such as tablet PCs and personal digital assistants (PDAs) since the mobility advantages that such computers or systems provide would be diminished by a relatively bulky input device such as a keyboard and/or a mouse.

Since a stylus resembles a pen and has sufficient controllability, many systems that receive input from a stylus are also designed to receive handwriting from a user. For example, input from the stylus may be received by the digitizer as "digital ink" or a series of points connected by a line. In some instances, the handwriting may simply be stored on the system such that it may at some later time be presented again for viewing by the user. In other instances, however, it may be advantageous to perform one or more functions on the handwriting. For example, the handwriting may be converted into ASCII text such that it can be pasted into a text document, which can then be edited or used for other purposes. In other examples, the handwriting may be a signature of a user. The signature may be compared to known signatures to determine a user's identity. In this manner, the signature may be used to log users into a system, a system account, or a network. In addition, the signature may be used to grant a user access to one or more documents, files, and/or programs on a system or network.

There are many algorithms and methods currently available for use in recognizing handwriting. Due to the natural variation in different peoples handwriting, many of these algorithms and methods provide some capability for accounting for variability such as slant, tilt, or lean variations in handwriting. However, for handheld systems and other portable systems such as tablet PCs, an additional variation is introduced in handwriting due to the different positions in which the system may be arranged during writing. For example, the angle at which a user holds a tablet PC varies especially when various screen orientations come into play (landscape vs. portrait). Human nature causes a tablet PC user to adjust his signature to compensate for an inconsistently slanted tablet PC (and the resulting non-horizontal guideline). However, this compensation results in a varying amount of tilt or lean in the signature. This tilt may prevent the signature recognition software from properly identifying an otherwise "correct" signature.

Figure 2:
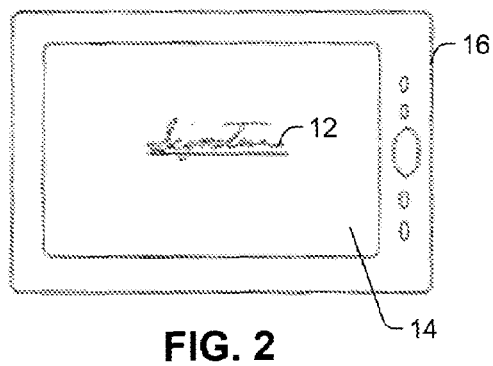

For example, FIGS. 1 and 2 illustrate signatures 10 and 12, respectfully, written by the same user on digitizer 14 while holding tablet PC 16 at different angles. In particular, signature 10 is generally representative of a signature that is substantially "non-tilted" (e.g., the signature was written with a "non-tilted" tablet PC). Signature 10 may be used as a reference signature or a known signature as further described herein. Signature 12 is generally representative of the signature shown in FIG. 1, but is tilted (e.g., the signature was written with a tablet PC "tilted" to the left). Therefore, as shown in FIGS. 1 and 2, the signatures have different slants, which can be seen by the diagonal nature of the "vertical" strokes of signature 12. Therefore, if signature 12 is a signature to be verified or a "signature under test" (SUT), due to these variations in tilt, "standard" signature recognition algorithms may be unable to properly recognize the user's signature consistently. Therefore, to be effective, a signature recognition method or algorithm will preferably compensate for this tilt.

Figure 3:
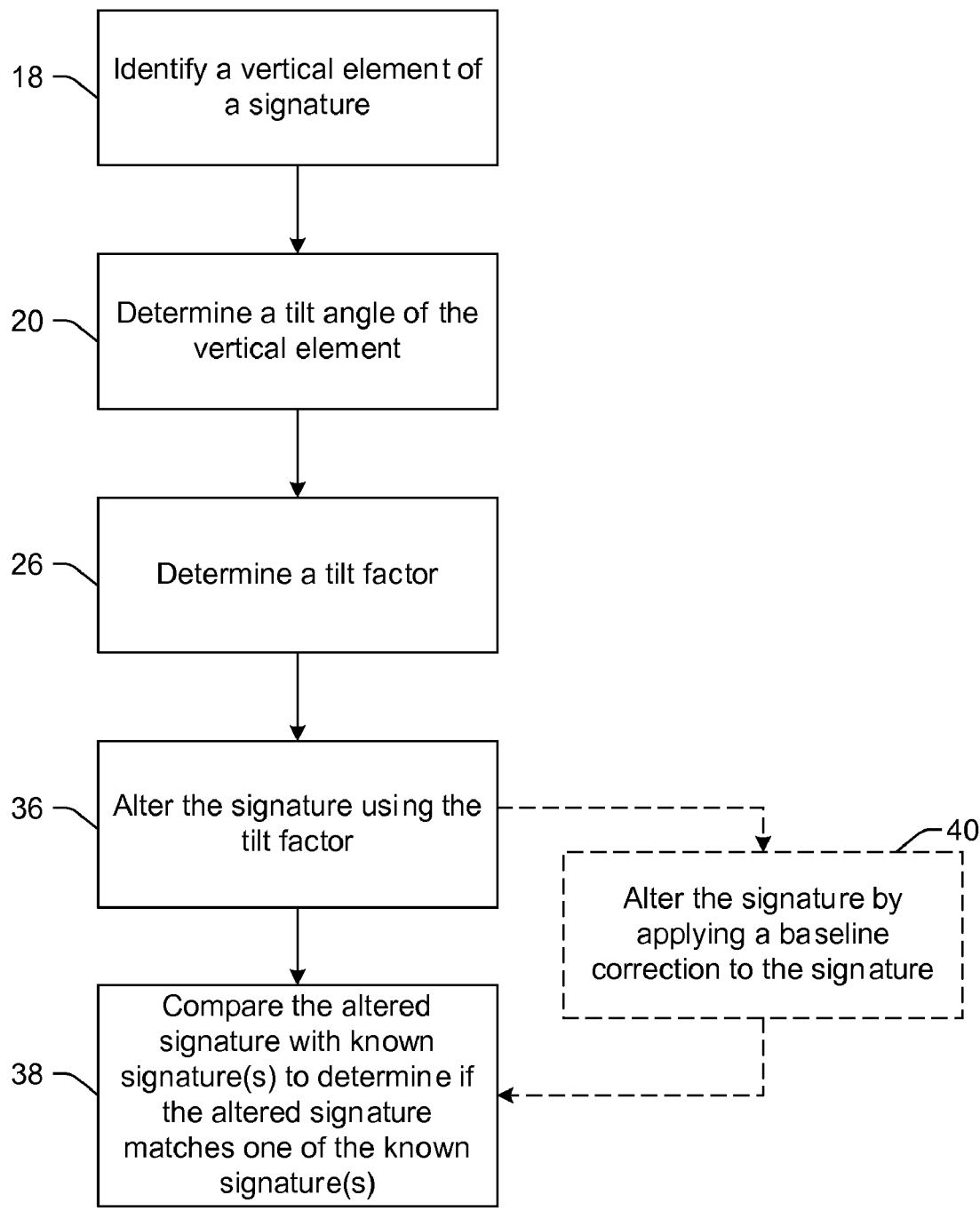
FIG. 3 is a flow chart illustrating one embodiment of a computer-implemented method for recognizing a signature.

FIG. 3 illustrates a flow chart of one embodiment of a computer-implemented method for recognizing a signature. As will be described further herein, this method alters a signature to account for varying amounts of slant or tilt in the signature thereby increasing the accuracy of the signature recognition method. A signature may be written on a digitizer with a stylus by a user. Using the computer-implemented method to recognize such a signature may be particularly advantageous since the digitizer and the stylus can be arranged at different angles by a user thereby introducing varying amounts of tilt into the signature. Therefore, unless the signatures are corrected for tilt, signature recognition methods used for these signatures may be largely unsuccessful in recognizing any signatures.

A signature may also be written on a tablet computer by a user. The tablet computer may include any such device commercially available from companies including, but not limited to, Motion Computing, Fujitsu, Acer, Toshiba, Compaq, and ViewSonic. Tablet computers are becoming more and more popular and also include a digitizer and a stylus. Therefore, signatures written on a tablet computer may have varying tilts as described above. The signature may be written by a user at a log in prompt of a tablet PC. Incorporation of a signature recognition tilt-adjustment software mechanism would greatly increase the accuracy of the signature-based tablet PC login application.

In addition, a signature may be written by a user at a login prompt of a different computer or a system. For example, many computers or systems commercially available today such as PDAs allow a user to enter handwriting as input using a stylus or other similar input device. In this manner, signatures written on a PDA or another handheld computer or system may have varying tilts. These computers and systems may be configured to use the computer-implemented method described herein to implement a signature recognition log in function. Other computers and systems may also be configured to use the computer-implemented method described herein to implement a signature recognition log in function such as automated teller machines (ATMs), point of sale (POS) devices, and banking systems. For example, such systems may be equipped with a stylus or another similar input device and a digitizer. Since the digitizer may be arranged at various angles with respect to the user, signatures acquired by these systems may also vary in tilt.

Therefore, the methods described herein may be used for signatures acquired from a number of different devices or systems. In addition, the computer-implemented methods described herein may be performed after a user is finished writing a signature. The computer-implemented method may determine that a user has finished writing a signature by detecting the amount of time that has elapsed since the user has stopped writing. Alternatively, a different computer-implemented method may determine that a user has finished writing and then may send the acquired signature to the signature recognition methods described herein. In another alternative, the device on which a user is writing his signature may prompt the user to indicate that he has finished writing his signature (e.g., by tapping a button displayed at the login prompt). In this manner, upon detection of a finished indication from the user by the computer-implemented methods described herein or other computer-implemented methods, the signature may be analyzed as described herein. Alternatively, the computer-implemented methods described herein may be performed as the signature is being written by the user (i.e., in real time).

The tilt adjustment mechanism can be implemented by applying a bias (or offset) based on one or more "vertical" elements of the signature. As shown in step 18, the method includes identifying a vertical element of a signature. In addition, the method may include identifying one or more vertical elements of the signature. A vertical element of a signature may be identified by analyzing digital data representative of the signature to identify a character, one or more strokes of a character, or an average of two or more strokes of a character, that has some extent in a generally vertical direction. The vertical element(s) may include strokes or characters of the signature that are longer than an average length of the strokes or characters in a generally vertical direction such as the "S" and the "t" of the signatures shown in FIGS. 1 and 2. However, the vertical element(s) may includes strokes or characters of the signature that have a length that is shorter than or about equal to an average length of the strokes or characters in a generally vertical direction.

Figure 4:
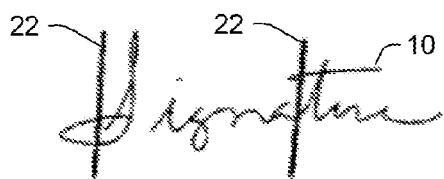
FIGS. 4 and 5 are schematic diagrams illustrating different tilt angles of vertical elements of the signatures of FIGS. 1 and 2, respectively.
Figure 5:
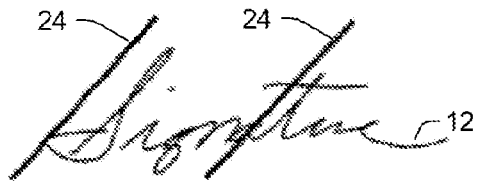

The method also includes determining a tilt angle of the vertical element(s), as shown in step 20 of FIG. 3. Tilt angle is defined by a line that is approximately parallel to the vertical element(s). For example, the tilt angles of the "S" and "t" of signature 10 are shown in FIG. 4 by lines 22, which are approximately parallel to the vertical elements of the characters. The tilt angles of the "S" and "t" of signature 12 are illustrated in FIG. 5 by lines 24, which are approximately parallel to the vertical elements of these characters. Although two different tilt angles for each of signatures 10 and 12 have been determined as shown in FIGS. 4 and 5, it is to be understood that one or more tilt angles of a signature may be determined in step 20. In addition, although the two tilt angles of signature 10 are shown to be approximately the same (as are the two tilt angles of signature 12), it is to be understood that multiple tilt angles of a single signature may be different. In some instances, an overall tilt angle for the entire signature may be determined as an average of more than one tilt angle.

In a more likely alternative, the tilt angles may be used independently as described further herein for different portions of the signatures since the individual tilt angles may be representative of characteristic features of a signature.

Figure 6:
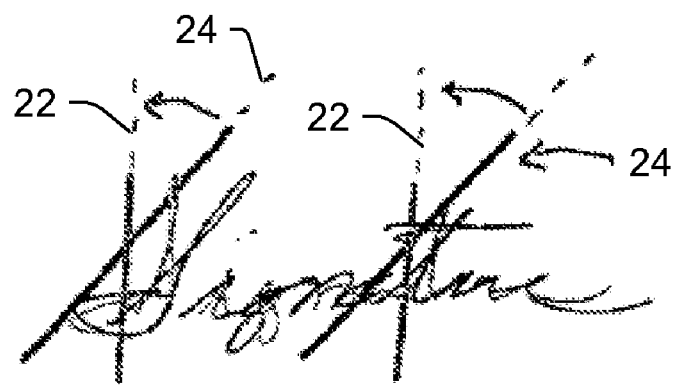
FIGS. 6 and 7 are schematic diagrams illustrating tilt factor and how a signature can be altered by the tilt factor.

As shown in step 26 of FIG. 3, the method further includes determining a tilt factor. Tilt factor is defined as a horizontal offset between the tilt angle and a reference tilt as a function of distance from a signature baseline. In one example, FIG. 6 illustrates the differences between the tilt angles of signatures 10 and 12 by illustrating the signatures overlaid. Since signature 10 is generally representative of a "non-tilted" or reference signature, the tilt angle of signature 10 may be assigned as the reference tilt. Alternatively, in the absence of a generally non-tilted signature sample, a reference tilt may be arbitrarily assigned and used as further described herein. As shown in FIG. 6, there is a horizontal offset between the tilt angles of signature 10 and signature 12 that varies as a function of distance in a vertical direction.

Figure 7:

As further shown in FIG. 7, signature baseline 28 may be identified. The signature baseline may be determined independently for individual signatures (e.g., as an average of the lowermost points of the characters of the signature). Alternatively, the signature baseline may be determined as the location of a horizontal guideline displayed on the digitizer for the user. As shown in FIG. 7, reference tilt 30, which is equivalent to line 22, has been moved in a horizontal direction such that the reference tilt intersects tilt angle 32, which is equivalent to line 20, at the signature baseline. Horizontal offset 34 between reference tilt 30 and tilt angle 32 may then be determined as a function of distance from signature baseline 28 (both above and below the signature baseline). This function thereby defines the tilt factor. In this manner, by finding certain elements of a known signature that are more or less upright, and matching them to the vertical elements of the signature under test (SUT), a tilt factor can be determined. As shown in FIG. 7, the tilt factor may be a linear function. However, it is to be understood that the tilt factor may have any function known in the art.

As shown in step 36 of FIG. 3, the method also includes altering the signature using the tilt factor. Preferably, altering the signature includes normalizing the signature such that the altered signature is substantially non-tilted. Alternatively, altering the signature may include normalizing the signature with respect to a reference signature or a known signature. In one embodiment, altering the signature may include determining a distance between a portion of the signature and the signature baseline. Altering the signature may also include identifying the horizontal offset corresponding to the distance using the tilt factor. In addition, altering the signature may include applying the corresponding horizontal offset to the portion of the signature. In this manner, the actual "ink" of the signature may be altered to compensate for slant. However, other signature details such as pen velocity and other stroke dynamics can be adjusted in the same way to account for the system tilt.

Preferably, altering the signature does not include segmenting the signature. For example, segmenting the signature may disadvantageously remove features that are characteristic of the signature. Therefore, segmenting the signature may reduce the accuracy of the signature recognition method. In addition, altering the signature preferably does not include rotating the signature. For example, rotating the signature as a whole will cause the signature baseline to be slanted thereby complicating the signature recognition method. Furthermore, altering the signature preferably does not include normalizing a thickness of elements of the signature. For example, the thickness of the elements of the signature may be characteristic features of the signature that can be used by the signature recognition method to identify the signature. Therefore, normalizing the thickness of the elements of the signature may reduce the accuracy of the signature recognition method.

The method also includes comparing the altered signature to one or more known signatures to determine if the altered signature matches one of the one or more known signatures, as shown in step 38 of FIG. 3. The comparing step may be performed with only a portion of the signature or with the entire signature. The altered signature may be compared with known signature(s) using any method or algorithm known in the art of signature recognition. One example of a "standard" method that can be used for signature recognition is the Sign-On™ application that was designed by Communication Intelligence Corporation (CIC®). The Sign-On application analyzes the shape, timing elements (speed and acceleration), and stroke sequence of a signature and verifies an identity from these components, which are called "biometric stroke dynamics." Additional examples of "standard" methods that can be used for signature recognition in step 38 are illustrated in U.S. Pat. No. 6,424,728 to Ammar, which is incorporated by reference as if fully set forth herein. In addition, the altered signature and a known signature may be determined as a match if the comparison results exceed some threshold of confidence for positively identifying a signature as being verified (e.g., 0.80 or variable depending on the user). Since applying a tilt factor adjustment (a horizontal offset based on the distance of each point from the signature baseline and the previously-determined tilt factor) to the SUT would correct for tilt, the "usual" signature recognition techniques may be applied with must better results.

The one or more known signatures may have been corrected for tilt prior to comparing the known signature(s) to the altered signatures. In this manner, comparing non-tilted known signature(s) to a known signature that is also normalized for tilt should increase the accuracy of the signature recognition method described herein. However, in an alternative embodiment, the one or more known signatures may not have been corrected for tilt prior to being compared to the altered signatures. For example, the tilt angle of the "template" signatures may be saved as a characteristic of each of the template signatures. Therefore, the tilt of a template or known signature can be used as the reference tilt. The signature under test would be adjusted to match this reference tilt angle, then the comparison would be performed. In this manner, if the tilt angle of the known signature is used as the reference tilt, then the altered signature will automatically be normalized to the known signature.

In some embodiments, the computer-implemented method may include one or more additional steps depending on whether or not the signature under test matches one of the known signature(s). For example, if the method matches the signature under test to a known signature of a user thereby verifying the signature, the method may include allowing the user to access a system or network, allowing a user to perform a function on a document, electronically signing a document, allowing the user to make a purchase at a real world "bricks and mortar" store or an online store, allowing the user to make a bank transaction, etc. Therefore, the computer-implemented methods described herein may be performed not only by a login module but also by other signature processing modules.

Alternatively, if the method does not match the signature under test to a known signature of a user who has been granted access to a system or network, the method may include one or more different steps. These steps may include prompting the user to rewrite his or her signature, prompting the user for a different identification mechanism such as a password, or locking the user out of the system temporarily. The steps which are performed by the method after comparing the altered signature to known signature(s) may vary depending on the type of system with which the signature was acquired and/or the level of security desired by administrators' of the system.

In some embodiments, prior to comparing the altered signature to known signature(s), the method may optionally include altering the signature by applying a baseline correction to the signature, as shown in step 40. Such an embodiment of the method may be particularly useful if the signature is written away from an expected signature baseline such as a horizontal guideline displayed on the digitizer as a guide for the user. Baseline correction is defined as a vertical offset between the signature baseline and a reference baseline as a function of distance from a starting line that corresponds to a leftmost point of the signature. Therefore, the baseline correction is essentially the tilt factor defined in a different direction. In this manner, the computer-implemented method illustrated in FIG. 3 may be used to correct tilt in two dimensions.

The reference baseline may be defined by the location of the horizontal guideline, the baseline of a known signature, or by another arbitrarily selected reference line. The starting line that corresponds to the leftmost point of the signature will vary from signature to signature and therefore may be determined by the computer-implemented method. The method may include identifying the leftmost point of the signature and then determining the starting line as a line that is substantially perpendicular to the reference baseline and that intersects the leftmost point of the signature. The signature baseline of the signature under test may also be determined as described above. The computer-implemented method shown in FIG. 3 may include any other steps of any other methods described herein.

Figure 8:
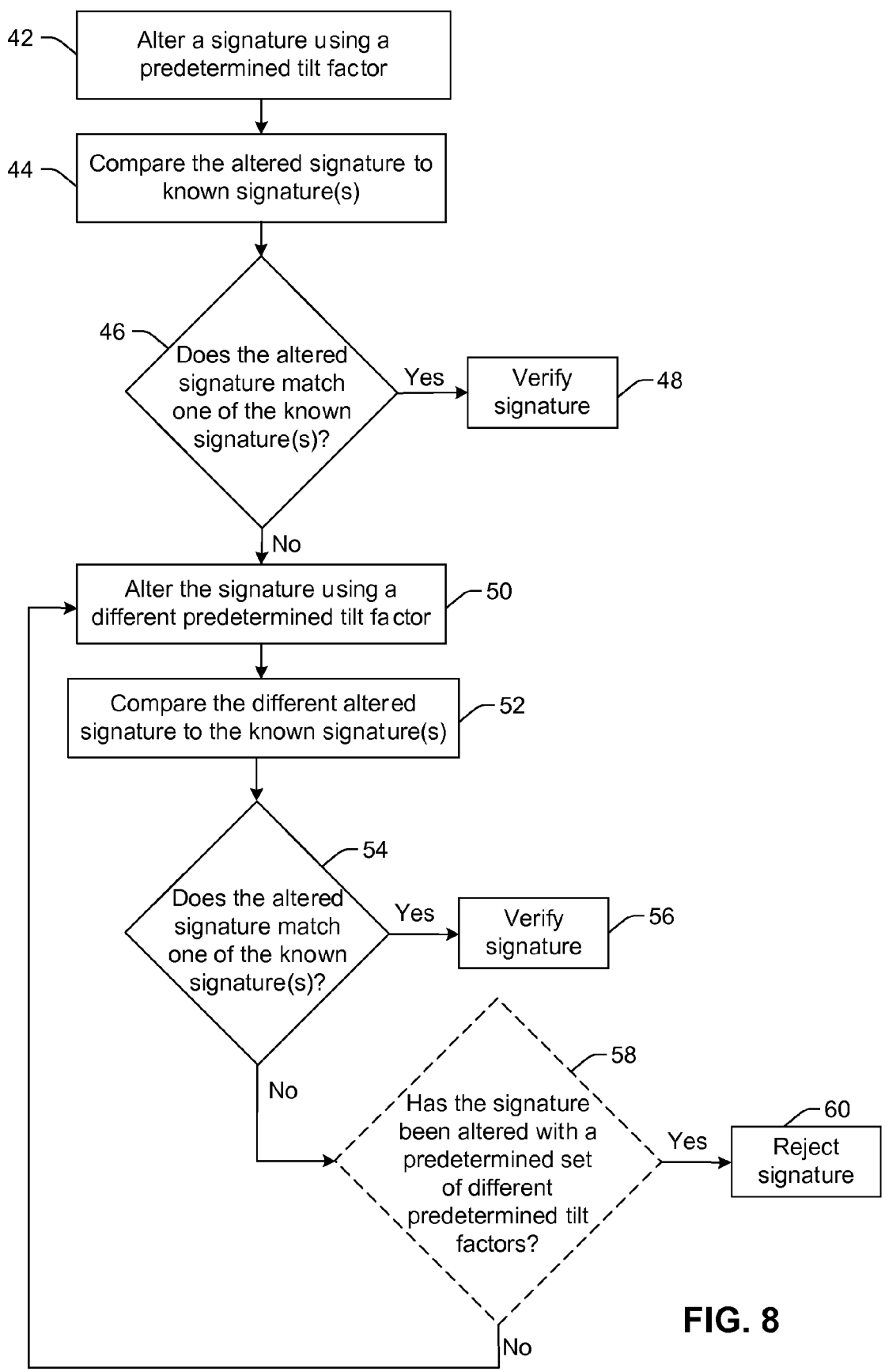
FIG. 8 is a flow chart illustrating another embodiment of a computer-implemented method for recognizing a signature.

FIG. 8 illustrates a flow chart of another embodiment of a computer-implemented method for recognizing a signature. This method differs from the embodiment illustrated in FIG. 3 in that instead of determining a tilt factor and altering the signature using the determined tilt factor, a signature is altered using a set of predetermined tilt factors. The altered signatures are then compared to known signatures to determine if there is a match. For example, as shown in step 42 of FIG. 8, the method includes altering a signature using a predetermined tilt factor. The predetermined tilt factor is defined as a horizontal offset as a function of distance from a signature baseline. The signature may be altered using the predetermined tilt factor as described above.

In addition, the method includes comparing the altered signature to one or more known signatures, as shown in step 44, and determining if the altered signature matches one of the one or more known signatures, as shown in step 46. As shown in step 48, if the altered signature matches one of the known signature(s), the method may include verifying the signature as the known signature that it matches. If the altered signature does not match one of the known signature(s), the method includes altering the signature using a different predetermined tilt factor, as shown in step 50. In this manner, the method includes altering the original signature with a different tilt factor. However, it is to be understood that in this step the method may alternatively include altering the previously altered signature by an increment or a change in the tilt factor.

As shown in step 52, the method includes comparing the different altered signature to the known signature(s). The method also includes determining if the different altered signature matches one of the known signature(s), as shown in step 54. As shown in step 56, if the different altered signature matches one of the known signature(s), the method may include verifying the signature as the known signature that it matches. If the different altered signature does not match one of the known signature(s), the method may include determining if the signature has been altered with a predetermined set of different predetermined tilt factors, as shown in optional step 58. In other words, the method may optionally include determining if the signature has been altered a satisfactory number of times or across a predetermined range of tilt factors. If the signature has been altered with a predetermined set of different predetermined tilt factors, the method may include rejecting the signature, as shown in step 60. If the signature has not been altered with a predetermined set of different predetermined tilt factors, the method may include repeating at least steps 50, 52, and 54 as shown in FIG. 8 until the signature has been altered with a predetermined set of different predetermined tilt factors. If the method does not include optional step 58, the method may include repeating steps 50, 52, and 54 until the different altered signature matches one of the one or more known signatures.

The method shown in FIG. 8 may also include any other steps of other methods described herein. For example, if the signature is rejected in step 60, the method shown in FIG. 8 may include prompting the user to rewrite his or her signature, prompting the user for a different identification mechanism such as a password, or locking the user out of the system temporarily as described above.

Known signature(s) described above may be established as "known" in a variety of ways. In one instance, a user may login to a system using a secure password or other identification information. The system may include program instructions that allow the user to enter a handwritten signature. Since the user has previously logged in to the system, the signature may then be known to belong to the user who is logged in to the system. Alternatively, the program instructions may prompt a user for any other identifying information prior to allowing the user to enter a signature.

In a similar manner, the Sign-On application described further above links the biometrics of a signature to a user name and password to create a dependable means of confirming an identity. In general, the Sign-On application prompts a user to enter a signature three times. The Sign-On application records variations in the signatures' size, shape, and timing. If the signatures are inconsistent or too simple, Sign-On may prompt the user to reenter the signatures. If the signatures are suitably consistent over the three entries, Sign-On will accept the signatures. Sign-On may then prompt the user to enter a password to associate with a user's signature. Alternatively, Sign-On may associate the signature with a password that the user has previously used to log in to the system. Sign-On then associates these variations with the user's password. The Sign-On application also stores this information in the system on which the signature was entered so that it can verify the user's signature each time the user logs on. Other methods may also be used to associate a signature with a user thereby rending the signature "known." Since a user may set up a number of system preferences that can be associated with the user's account, upon verifying a user's signature, the program instructions may grant access to the system and may configure the system according to the preferences of the user.

In some instances, the system may also include program instructions that allow a user to update their signature. For example, a signature of a user may change over time due to factors such as aging or an injury. In addition, a user may actively decide to change his or her signature, for instance, to shorten his or her signature. Therefore, the program instructions may be configured to allow the user to select a "change signature" option and to then enter a new signature. The program instructions may also be configured to prompt the user to enter a password or other identifying information before changing the known signature. Such protective measures would prevent someone other than the user from changing his or her signature while the user is logged in, but away from the system.

Figure 9:
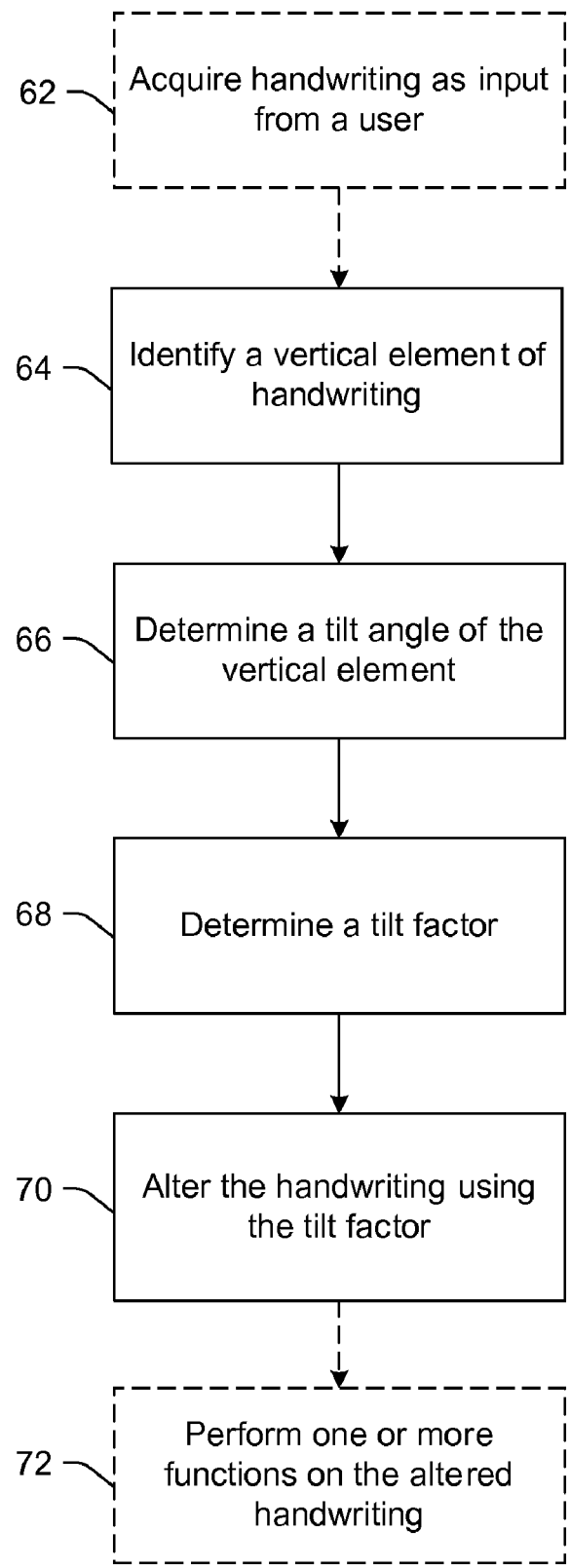
FIG. 9 is a flow chart illustrating one embodiment of a computer-implemented method for normalizing handwriting.

Obviously, the above-described methods are not limited to signature recognition. For example, the above-described methods may be used for correcting slant in handwriting. FIG. 9 is a flow chart illustrating one embodiment of a computer-implemented method for normalizing handwriting. In some embodiments, the method may include acquiring handwriting as input from a user, as shown in optional step 62. For example, the handwriting may be acquired as input written on a digitizer with a stylus by a user as described above. As further described above, the digitizer and the stylus can be arranged at different angles by the user, which may cause the handwriting to be slanted at various angles. In addition, the handwriting may be acquired as input from a user using a tablet computer as further described above. The handwriting may also be acquired by scanning a document, envelope, bank check, etc. that contains one or more handwritten alphanumeric characters.

The method also includes identifying a vertical element of the handwriting, as shown in step 64. Identifying vertical element(s) in handwriting may be performed as described above. In addition, the method includes determining a tilt angle of the vertical element, as shown in step 66. The tilt angle is defined by a line that is approximately parallel to the vertical element. The tilt angle may be determined as described above. Obviously, more than one vertical element of the handwriting may be identified, and a tilt angle for more than one vertical element may be determined individually or collectively (e.g., as an average). For example, steps 64 and 66 may be repeated at predetermined intervals during the normalization process to account for varying tilt within the handwriting. Such varying tilt within the handwriting may be caused by shifting of the angles at which a digitizer and/or a stylus are arranged during writing by a user. Such varying tilt may be particularly problematic for relatively long handwriting samples or inputs. Therefore, correcting for changes in tilt angle within a handwriting sample may particularly increase the accuracy of the normalization of relatively long handwriting samples.

As shown in step 68, the method includes determining a tilt factor. The tilt factor is defined as a horizontal offset between the tilt angle and a reference tilt as a function of distance from a signature baseline. The tilt factor may be determined as described above. The method also includes altering the handwriting using the tilt factor, as shown in step 70. Preferably, altering the handwriting produces altered handwriting that is substantially non-tilted. The method may also include analyzing the handwriting by performing one or more functions on the altered handwriting, as shown in optional step 72. For example, analyzing the altered handwriting may include character recognition, character segmentation, conversion of the handwriting to a different form, comparing the handwriting to other handwriting, etc. Analyzing the altered handwriting may also include other normalization methods such as normalizing the thickness of the altered handwriting. The one or more functions that are performed on the altered handwriting may include any methods or algorithms known in the art. Examples of such methods are illustrated in U.S. Patent Application Publication No. US 2002/0118879 by Hickerson et al., which is incorporated by reference as if fully set forth herein. Since the altered handwriting has been corrected for slant prior to performing these functions, the results of these functions may be substantially more accurate than if the handwriting had not been corrected. The method shown in FIG. 9 may further include any other steps of other methods described herein.

It is to be understood that the above-described methods for signature recognition and handwriting normalization can be used in a variety of applications including, but not limited to, a login function for a computer or system, identification of handwritten characters on bank checks, postal mail or packages, bank check authorization or verification, point of sale authorization, and criminal forensic analysis. In addition, although the methods described herein have been described with respect to signature recognition and handwriting normalization, it is to be understood that these methods can be used to recognize or normalize other input that may have varying tilt. For example, the methods described herein may be used in other identification methods or systems such as methods for retinal scan identification or fingerprint recognition. In such implementations, the method may be used to identify one or more vertical elements of the retinal scan or the fingerprint, determine a tilt angle of the vertical element(s), determine a tilt factor, and alter the retinal scan or the fingerprint using the tilt factor. In addition, such implementations may include comparing the altered retinal scan or fingerprint to known retinal scan(s) or fingerprint(s) using any method known in the art to determine if there is a match.

Furthermore, although the above-described methods are described with respect to a stylus and a digitizer, it is to be understood that the methods may be used for signatures or handwriting acquired by any input devices. For example, it is conceivable that mouse-type input devices may become sufficiently controllable such that they can be used to input handwriting. In addition, it is conceivable that input devices such as a touch pad (as on a laptop) or a touch screen may be configured to receive handwriting by tracking the movement of a finger over the touch pad or the touch screen. In another example, it is conceivable that handwriting may be input using a non-contact method such as by detecting movement of a laser pointing device over a light sensitive screen or by detecting movement of another signal, a force, or field over a two-dimensional sensor in a non-contact manner.

Program instructions implementing methods such as those described herein may be transmitted over or stored on a carrier medium. The carrier medium may be a transmission medium such as a wire, cable, or wireless transmission link, or a signal traveling along such a wire, cable, or link. The carrier medium may also be a storage medium such as a read-only memory, a random access memory, a magnetic or optical disk, or a magnetic tape.

In an embodiment, a processor may be configured to execute the program instructions to perform a computer-implemented method according to the above embodiments. The processor may take various forms, including a personal computer system, a tablet PC, mainframe computer system, workstation, network appliance, Internet appliance, PDA, television system or other device. In general, the term "computer system" may be broadly defined to encompass any device having a processor, which executes instructions from a memory medium.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

Further modifications and alternative embodiments of various aspects of the invention may be apparent to those skilled in the art in view of this description. For example, methods and systems for slant compensation in handwriting and signature recognition are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method comprising program instructions stored on a storage medium and executed by a processor for recognizing a signature, comprising:
    first program instructions executable for identifying a vertical element of the signature;
    second program instructions executable for determining a tilt angle of the vertical element, wherein the tilt angle is defined by a line that is approximately parallel to the vertical element;
    third program instructions executable for determining a tilt factor, wherein the tilt factor is defined as a linear function in which a horizontal offset between the tilt angle and a reference tilt of a known signature varies with vertical distance from a signature baseline;
    fourth program instructions executable for altering the signature using the tilt factor; and
    fifth program instructions executable for comparing the altered signature to the known signature to determine if the altered signature matches the known signature.

2. The method of claim 1, wherein the signature comprises a signature written on a digitizer with a stylus by a user, and wherein the digitizer and the stylus are arranged at different angles by the user.

3. The method of claim 1, wherein the signature comprises a signature written on a tablet computer by a user.

4. The method of claim 1, wherein the signature comprises a signature written by a user at a login prompt of a computer or a system.

5. The method of claim 1, wherein the computer-implemented method is performed as the signature is being written by a user.

6. The method of claim 1, wherein the known signature has been corrected for tilt.

7. The method of claim 1, wherein said fourth program instructions executable for altering the signature does not include rotating the signature.

8. The method of claim 1, wherein said fourth program instructions executable for altering the signature does not include segmenting the signature.

9. The method of claim 1, wherein said fourth program instructions executable for altering the signature does not include normalizing a thickness of elements of the signature.

10. The method of claim 1, wherein said fourth program instructions executable for altering the signature comprises determining a vertical distance between a portion of the signature and the signature baseline, identifying the horizontal offset corresponding to the vertical distance using the tilt factor, and applying the corresponding horizontal offset to the portion of the signature.

11. The method of claim 1, further comprising, prior to executing said fifth program instructions for comparing the altered signature to the known signature, sixth program instructions executable for further altering the signature by applying a baseline correction to the signature, wherein the baseline correction is defined as a vertical offset between the signature baseline and a reference baseline of the known signature as a function of distance from a starting line that corresponds to a leftmost point of the signature.

12. A computer-implemented method comprising program instructions stored on a storage medium and executed by a processor for recognizing a signature, comprising:
    first program instructions executable for altering the signature using a predetermined tilt factor, wherein the predetermined tilt factor is defined as a linear function in which a horizontal offset between a tilt angle of the signature and a reference tilt of a known signature varies with vertical distance from a signature baseline;
    second program instructions executable for comparing the altered signature to one or more known signatures to determine if the altered signature matches one of the one or more known signatures, wherein if the altered signature does not match one of the one or more known signatures, the method further comprises:
    third program instructions executable for altering the signature using a different predetermined tilt factor; and
    fourth program instructions executable for comparing the different altered signature to the one or more known signatures to determine if the different altered signature matches one of the one or more known signatures.

13. The method of claim 12, further comprising fifth program instructions executable for repeating said altering the signature using a different predetermined tilt factor and said comparing the different altered signature until the different altered signature matches one of the one or more known signatures.

14. The method of claim 12, further comprising fifth program instructions executable for repeating said altering the signature using a different predetermined tilt factor and said comparing the different altered signature until the signature has been altered with a predetermined set of different predetermined tilt factors.

15. A computer-implemented method comprising program instructions stored on a storage medium and executed by a processor for normalizing handwriting, comprising:
    first program instructions executable for identifying a vertical element of the handwriting;
    second program instructions executable for determining a tilt angle of the vertical element, wherein the tilt angle is defined by a line that is approximately parallel to the vertical element;
    third program instructions executable for determining a tilt factor, wherein the tilt factor is defined as a linear function in which a horizontal offset between the tilt angle and a reference tilt of a known signature of varies with vertical distance from a signature baseline; and
    fourth program instructions executable for altering the handwriting using the tilt factor.

16. The method of claim 15, further comprising fifth program instructions executable for acquiring the handwriting as input written on a digitizer with a stylus by a user, wherein the digitizer and the stylus are arranged at different angles by the user.

17. The method of claim 15, further comprising fifth program instructions executable for acquiring the handwriting as input from a user using a tablet computer.

18. The method of claim 15, further comprising fifth program instructions executable for analyzing the altered handwriting by performing one or more functions on the altered handwriting.

19. The method of claim 15, further comprising fifth program instructions executable for repeating said identifying, said determining the tilt angle, and said determining the tilt factor at predetermined intervals to account for varying tilt within the handwriting.

* * * * *